United States Patent
Reed et al.

(10) Patent No.: US 10,450,500 B2
(45) Date of Patent: Oct. 22, 2019

(54) THERMALLY STABLE POLYMERS FOR ENHANCED OIL RECOVERY

(71) Applicant: Ecolab USA Inc., St. Paul, MN (US)

(72) Inventors: Peter E. Reed, Plainfield, IL (US); William J. Andrews, Parker, CO (US); Ashish Dhawan, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 974 days.

(21) Appl. No.: 14/594,706

(22) Filed: Jan. 12, 2015

(65) Prior Publication Data

US 2016/0200963 A1    Jul. 14, 2016

(51) Int. Cl.
*C09K 8/588* (2006.01)
*C08F 26/04* (2006.01)

(52) U.S. Cl.
CPC ............. *C09K 8/588* (2013.01); *C08F 26/04* (2013.01)

(58) Field of Classification Search
CPC ...................................... C09K 8/588
USPC ...................................... 166/305.1
See application file for complete search history.

(56) References Cited

U.S. PATENT DOCUMENTS

| | | |
|---|---|---|
| 4,455,240 A | 6/1984 | Costello |
| 4,460,477 A | 7/1984 | Costello et al. |
| 4,476,931 A | 10/1984 | Boles et al. |
| 4,484,631 A * | 11/1984 | Sherwood ............. C02F 5/12 166/294 |
| 4,510,059 A | 4/1985 | Amjad et al. |
| 4,533,708 A * | 8/1985 | Costello .................. C02F 5/12 526/239 |
| 4,715,962 A | 12/1987 | Bhattacharyya et al. |
| 4,737,550 A | 4/1988 | Tomalia |
| 4,836,282 A | 6/1989 | Hsieh |
| 5,013,456 A | 5/1991 | St. John et al. |
| 5,099,923 A | 3/1992 | Aften et al. |
| 5,152,906 A | 10/1992 | Aften et al. |
| 5,155,156 A | 10/1992 | Scanley |
| 5,200,448 A | 4/1993 | Robinson et al. |
| 5,298,555 A | 3/1994 | O'Connor et al. |
| 5,376,713 A | 12/1994 | O'Connor et al. |
| 6,169,058 B1 | 1/2001 | Le et al. |

(Continued)

FOREIGN PATENT DOCUMENTS

| | | |
|---|---|---|
| CN | 101302266 A | 11/2008 |
| CN | 101463116 A | 6/2009 |

(Continued)

OTHER PUBLICATIONS

The International Search Report and Written Opinion dated Apr. 20, 2016 in connection with International Patent Application No. PCT/US2015/067651.

(Continued)

*Primary Examiner* — William D Hutton, Jr.
*Assistant Examiner* — Ashish K Varma
(74) *Attorney, Agent, or Firm* — Kagan Binder, PLLC (57) ABSTRACT

Disclosed herein are polymer compositions useful in high temperature enhanced oil recovery applications. The polymer compositions include at least 20 mol % of an N,N-dialkyl-N,N-diallylammonium salt and further have a net negative charge. The polymer compositions provide polymer dispersions in water or brine having stable viscosity when maintained at temperatures of 100° C. and above for at least 2 days.

3 Claims, 6 Drawing Sheets

(56) References Cited

U.S. PATENT DOCUMENTS

| | | | |
|---|---|---|---|
| 6,864,314 | B1 | 3/2005 | Yeung et al. |
| 6,984,705 | B2 | 1/2006 | Chang et al. |
| 7,159,655 | B2 | 1/2007 | Ke et al. |
| 7,182,136 | B2 | 2/2007 | Dalrymple et al. |
| 7,270,180 | B2 * | 9/2007 | Ke .................. E21B 37/00 166/279 |
| 7,335,700 | B2 | 2/2008 | Yeung et al. |
| 7,347,263 | B2 * | 3/2008 | Beckman .............. C08L 101/14 166/270 |
| 7,398,824 | B1 | 7/2008 | Wang et al. |
| 7,759,292 | B2 | 7/2010 | Eoff et al. |
| 7,915,212 | B2 | 3/2011 | Yeung et al. |
| 8,258,083 | B2 | 9/2012 | Bicerano |
| 8,278,250 | B2 | 10/2012 | Dalrymple et al. |
| 8,492,481 | B2 | 7/2013 | Yeung et al. |
| 8,592,353 | B2 | 11/2013 | Dalrymple et al. |
| 8,614,171 | B2 | 12/2013 | Hoch et al. |
| 8,764,974 | B2 | 7/2014 | Cross et al. |
| 8,980,800 | B2 | 3/2015 | Beall et al. |
| 2003/0203826 | A1 | 10/2003 | Aubay et al. |
| 2007/0021309 | A1 | 1/2007 | Bicerano |
| 2007/0181302 | A1 | 8/2007 | Bicerano |
| 2008/0161208 | A1 | 7/2008 | Beckman et al. |
| 2008/0194432 | A1 | 8/2008 | Heidlas et al. |
| 2010/0062953 | A1 | 3/2010 | LoSasso et al. |
| 2011/0136703 | A1 | 6/2011 | Hoch et al. |
| 2011/0240309 | A1 | 10/2011 | Kingma et al. |
| 2012/0157551 | A1 | 6/2012 | Findlay et al. |
| 2013/0005616 | A1 | 1/2013 | Gaillard et al. |
| 2014/0190699 | A1 | 7/2014 | Fletcher et al. |

FOREIGN PATENT DOCUMENTS

| | | |
|---|---|---|
| CN | 101619119 A | 1/2010 |
| CN | 101798503 A | 8/2010 |
| CN | 101839123 A | 9/2010 |
| CN | 102277147 A | 12/2011 |
| CN | 102304200 A | 1/2012 |
| CN | 102585093 A | 7/2012 |
| CN | 102732240 A | 10/2012 |
| CN | 102816279 A | 12/2012 |
| CN | 103205247 A | 7/2013 |
| DE | 160779 A3 | 3/1984 |
| EP | 0082657 A2 | 6/1983 |
| EP | 0156031 A1 | 10/1985 |
| WO | WO9014403 A1 | 11/1990 |
| WO | WO 20000034581 A1 | 6/2000 |
| WO | WO03020391 A1 | 3/2003 |
| WO | WO2012069438 A1 | 5/2012 |
| WO | WO2012069477 A1 | 5/2012 |
| WO | WO2012069478 A1 | 5/2012 |
| WO | WO2012136064 A1 | 10/2012 |

OTHER PUBLICATIONS

Yi D et al. "Studies on Viscosity Enhancement of P ( −) / P (-DMDAA) complex used as agent". State Key Laboratory Polymer Materials Engineering Polymer Research, Institute Chengdu University of Sci. & Techn., Chengdu, Peop. Rep. China 610065, 1997, vol. 18, No. 5, pp. 818.

Zhang, Hong-jing et al. "Application of acrylamide/dimethyl diallyl ammonium chloride/acrylic acid ternary polymer in acidizing process." Key Lab of Oil and Gas Reservoir Geophysical and Development Engineering, Southwest University of Petroleum, Chengdu, Sichuam, Peoples Republic of China, 2006, 20 (5), pp. 84-86, and 89.

Duan, Xuqin et al. "Filtration aid effect of a copolymer of dimethyldiallylammonium chloride, acrylamide and acrylic acid." College of Chemistry and Environmental Engineering, China University of Mining and Technology, Beijing, Peoples Republic of China, 2003, 6, pp. 70-73.

Jianhua, Cheng et al. "Synthesis and characterization of amphiphilic organic polymeric flocculent decoloring agent PAM/AMPS/DMDAAC." Advances in Fine Petrochemicals. College of Environmental Science and Engineering, South China University of China, Guangzhou, China. pp. 14-18.

Extended European Search Report in European Application No. 15878294.6, dated May 17, 2018, 13 pages.

Examination Report for European Application No. 15878294.6, dated Mar. 26, 2019, 6 pages.

* cited by examiner

THERMALLY STABLE POLYMERS FOR ENHANCED OIL RECOVERY

TECHNICAL FIELD

The present invention relates to polymer compositions for use in high temperature enhanced oil recovery applications. The polymer compositions provide dispersions in water or brine having stable viscosity when maintained at temperatures of 100° C. and above for at least 2 days.

BACKGROUND

Crude oil development and production in U.S. oil reservoirs can include up to three distinct phases: primary, secondary, and tertiary (or enhanced) recovery. During primary recovery, the natural pressure of the reservoir or gravity drives oil into the wellbore, combined with artificial lift techniques (such as pumps) which bring the oil to the surface. But only about 10 percent of a reservoir's original oil in place is typically produced during primary recovery. Secondary recovery techniques extend a field's productive life generally by injecting water or gas to displace oil and drive it to a production wellbore, resulting in the recovery of 20 to 40 percent of the original oil in place. Enhanced oil recovery, or EOR, is a generic term encompassing techniques for increasing the amount of crude oil that can be extracted from a subterranean formation such as an oil field.

However, after much of the easy-to-produce oil is recovered from an oil field, tertiary recovery, or enhanced oil recovery (EOR), techniques offer prospects for ultimately producing 30 to 60 percent, or more, of the reservoir's original oil in place. Three major categories of EOR have been found to be commercially successful to varying degrees:

Thermal recovery—the introduction of heat such as the injection of steam to lower the viscosity of the oil, and improve its ability to flow through the reservoir.

Gas injection—injection of gases such as natural gas, nitrogen, or carbon dioxide that expand in a reservoir to push additional oil to a production wellbore, or gases that dissolve in the oil to lower its viscosity and improve flow rate.

Chemical injection—injection of polymer dispersions to increase the effectiveness of waterfloods, or the use of detergent-like surfactants to help lower the surface tension that often prevents oil droplets from moving through a reservoir. Chemical injection of a polymer is also referred to as polymer flooding. This method improves the vertical and areal sweep efficiency as a consequence of improving the water/oil mobility ratio. In addition, the polymer reduces the contrasts in permeability by preferentially plugging the high permeability zones flooded by polymers. This forces the water to flood the lower permeability zones and increases the sweep efficiency. The art in this area is well-developed for conventional oil recovery applications.

However, finding and producing new hydrocarbon reserves involves contending with increasingly harsh downhole conditions. In the past, the challenging environments of High Pressure/High Temperature (HP/HT) wells were considered uneconomic. However, as technologies evolved, tapping these reservoirs became an economic reality. An HP/HT well is considered so when the conditions of the well are hotter or more pressurized than conventional wells. In many HP/HT wells, the bottomhole temperature (temperature at the total depth of the well) is 100° C. or higher, for example 120° C. to 170° C. In some deep North Sea reservoirs, condensate gases have been found at temperatures up to 190° C. and pressures up to 1100 bar. These conditions are combined in a subterranean environment that includes fresh water, brackish water, or seawater.

As long as these fields have large enough reservoirs, the development of HP/HT wells is expected to continue. However, the harsh conditions encountered inside such reservoirs present a challenge for suppliers of equipment and materials for these operations. Operators can be expected to continue pushing the boundaries of operable methodology in order to replace more easily obtained reserves in all types of oil recovery operations. And materials injected during polymer flooding may reside inside a reservoir at elevated temperatures for months, being subjected to these harsh conditions for as long as two years. As a result, there is a need in the industry to develop technologies suitable for carrying out enhanced oil recovery in conjunction with the challenging conditions encountered in HP/HT wells. Conventional polymers used for EOR, for example, are hydrolytically unstable in high temperature conditions, such as temperatures over 100° C. Hydrolysis or other deleterious reactions lead to permanently lowered viscosity and even precipitation of these polymers during use.

Organic polymers traditionally used in EOR include water soluble polymers such as polyacrylamides, polyacrylates, and hydrophobically modified water soluble polymers, also called associative polymers or associative thickeners. In water or seawater dispersions at temperatures of 100° C. and above, ester and amide functionalities hydrolyze to carboxylic acid or a salt thereof at a rate of hours to weeks depending on conditions such as pH and salt concentration. Consequences of hydrolysis include substantial loss of dispersion viscosity and even precipitation, both of which lead to reduced recovery rates of oil from subterranean formations.

Attempts to compensate for loss of viscosity due to hydrolysis include providing a very high initial viscosity dispersion, such that after hydrolysis is complete a sufficient dispersion viscosity is maintained to carry out EOR. However, the initial viscosity of such dispersions is typically sufficiently high to impede its injection into the subterranean formation. Further, maximum efficiency in polymer flooding is realized by matching the viscosity of the polymer dispersion with the viscosity of the oil in the reservoir; wherein at temperatures above 100° C. the oil in the reservoir may display viscosities as low as 4 cP, for example about 4 to 8 cP.

Thus, there is a substantial need in the industry for polymer compositions that are suitable for use in enhanced oil recovery operations carried out at temperatures of 100° C. or greater.

SUMMARY

Disclosed herein are polymer compositions comprising about 20.00 mol % to 49.99 mol % of an N,N-dialkyl-N,N-diallylammonium salt, about 20.01 mol % to 80.00 mol % of an anionic monomer, and about 0 mol % to 59.99 mol % nonionic monomer; wherein the polymer composition comprises a net negative charge. In some embodiments, the N,N-dialkyl-N,N-diallylammonium salt is N,N-dimethyl-N,N-diallylammonium chloride. In some embodiments, the anionic monomer comprises acrylic acid, 2-acrylamido-2-methylpropane sulfonic acid, salts thereof, and mixtures thereof. In some embodiments, the nonionic monomer comprises acrylamide, N-vinyl pyrrolidone, or a mixture thereof. In some embodiments, the total carboxylate content of the polymer composition is about 80.00 mol % to 20.00 mol %, wherein total carboxylate content is the mole percent of anionic monomer having carboxylate groups plus the mole percent of nonionic monomers susceptible to hydrolysis at 100° C. to form carboxylate groups.

Also disclosed herein are polymer dispersions comprising a water source and about 0.01 wt % to 5 wt % of a polymer composition comprising about 20.00 mol % to 49.99 mol % of an N,N-dialkyl-N,N-diallylammonium salt, about 20.01 mol % to 80.00 mol % of an anionic monomer, and about 0 mol % to 59.99 mol % nonionic monomer; wherein the polymer composition comprises a net negative charge. In some embodiments, the water source is fresh water, produced water, municipal water, sea water, brackish water, or a synthetic version thereof. In some embodiments, the dispersion comprises about 0.3 wt % of the polymer composition and the initial viscosity of the dispersion is about 1 cP to 30 cP at 25° C., 39.6 s$^{-1}$. In some embodiments, the viscosity of the dispersion after storing the dispersion for about 21 days at 120° C. is about 50% to 500% of the initial viscosity. Where the water source is sea water or a synthetic version thereof, the viscosity of the dispersion after storing the dispersion for about 15 days at 120° C. is about 50% to 80% of the initial viscosity.

Also disclosed herein are methods of high temperature enhanced oil recovery, the methods comprising (a) forming a polymer composition comprising about 20.00 mol % to 49.99 mol % of an N,N-dialkyl-N,N-diallylammonium salt, about 20.01 mol % to 80.00 mol % of an anionic monomer, and about 0 mol % to 59.99 mol % nonionic monomer; wherein the polymer composition comprises a net negative charge; (b) adding water to the polymer composition to form a polymer dispersion, the dispersion comprising about 0.01 wt % to 5 wt % of the polymer composition; and (c) employing the polymer dispersion in an enhanced oil recovery operation in a subterranean reservoir wherein the reservoir environment includes temperatures of about 100° C. to 190° C. In some embodiments, employing the polymer dispersion in an enhanced oil recovery operation comprises injecting the polymer dispersion into the subterranean reservoir and allowing at least a portion of the polymer dispersion to remain within the reservoir for a period of 2 days to 700 days.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

As used herein, the term "polymer composition" means a water soluble or water dispersible copolymer of an N,N-dialkyl-N,N-diallylammonium halide (DDS) having a net negative charge. Net negative charge is determined by calculating the total molar amount of an anionic monomers incorporated in the copolymer relative to the total molar amount of cationic monomers incorporated in the copolymer. Cationic charge is determined by calculating the molar amount of DDS plus any optional additional cationic monomers incorporated in the polymer composition. Unless otherwise specified or provided by context, "polymer composition" refers to the polymer as synthesized, that is, prior to injection for EOR purposes or another use.

The term "monomer" is used in context to mean either an unsaturated compound or the polymerized residue thereof. As used herein, the term "anionic monomer" means an unsaturated compound or polymerized residue thereof bearing an acidic group having a pKa of about 5 or less, the conjugate base thereof bearing a negative charge, or a salt thereof. As used herein, the term "cationic monomer" means an unsaturated compound or polymerized residue thereof bearing a positive charge, or a salt thereof.

As used herein, the term "charge ratio" means the ratio of all cationic monomers to all anionic monomers in a polymer composition. Unless specified, calculation of charge ratio assumes that each anionic monomer bears or is capable of bearing a −1 charge and each cationic monomer bears a +1 charge. Where monomers bear a +2 or −2 charge, such monomers should be counted as two molar equivalents for the purpose of calculating net charge and the appropriate charge ratio of monomers employed to form the polymer compositions. As used herein, "net charge" means the theoretical sum of all charge in a polymer composition. Where the molar amount of anionic monomer exceeds the molar amount of cationic polymer, the polymer has a net positive charge. Where the molar amount of cationic monomer exceeds the molar amount of anionic polymer, the polymer has a net negative charge. In some embodiments a net charge of zero is referred to herein as a "zero charge state."

As used herein, the term "polymer dispersion" means a polymer composition substantially dispersed or dissolved in water or a waterbased solution. The polymer dispersion is a dispersion as formed, or in the case of some EOR applications the dispersion before injection, during injection, or after injection as determined by context. Waterbased solutions include one or more dissolved salts, buffers, acids, bases, surfactants, or other dissolved, dispersed, or emulsified compounds, materials, components, or combinations thereof.

As used herein, the term "high temperature" means at least 100° C., and in some embodiments greater than 100° C., as specified or determined by context.

As used herein, the term "stable" means a change in a selected property value of about 50% or less based on an initial property value, over a selected period of time.

As used herein, the term "heat stable" means a selected property value or structure is stable at temperatures of about 120° C. for a period of at least about 2 days.

As used herein, the term "hydrolytically stable" means not susceptible to substantial hydrolytic cleavage of one or more functionalities at 100° C.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Discussion

Polymer Compositions

We have found new polymer compositions capable of forming aqueous dispersions wherein the viscosity at 25° C. of the polymer dispersions is stable when the polymer dispersions are exposed to temperatures of 100° C. and greater, for example about 120° C., continuously for a period of at least 2 days. The polymer dispersions have suitable viscosity to achieve mobility control in enhanced oil recovery (EOR) applications at high reservoir temperatures. Other applications of these polymer compositions include high temperature coating of waterborne compositions in extrusion or die coating applications, and other applications in which stable polymer dispersion viscosity is required at temperatures over 100° C.

The polymer compositions comprise, consist essentially of, or consist of water-soluble copolymers (including terpolymers and higher order polymers) of N,N-dialkyl-N,N-diallylammonium salts (DDS), wherein the polymer composition includes a net negative charge. Net negative charge is achieved by the incorporation of anionic monomer into the polymer, wherein the total molar amount of anionic functionality exceeds the molar amount of DDS plus any other cationic functionality present in the polymer.

The N-alkyl moieties of the DDS monomers are independently hydrocarbyl moieties having 1 to 20 carbons configured in a linear, branched, or cyclic arrangement. In some embodiments, both N-alkyl groups are methyl. In some embodiments, the DDS monomer is water soluble. In some embodiments, one or both N-alkyl groups is a hydrocarbyl moiety having 8 to 20 carbons, or 10 to 20 carbons, or 12 to 20 carbons arranged in a linear conformation. In some embodiments, the counterion of the DDS monomer is a halide such as chloride or bromide, or a sulfonate, phosphonate, or carboxylate anion. In some embodiments, the counterion is chloride. In such embodiments, the DDS monomer is N,N-diallyl-N,N-dimethylammonium chloride, known as DADMAC.

The polymer compositions include less than about 50 mol % DDS in order to enable provision of an excess molar proportion of anionic functionality in the polymer—that is, a net negative charge polymer. In some embodiments, the polymer compositions include at least about 20.00 mol % DDS. For example in some embodiments the polymer compositions include about 20.00 mol % to 49.99 mol % DDS, or about 25.00 mol % to 49.00 mol % DDS, or about 27.00 mol % to 45.00 mol % DDS, or about 30.00 mol % to 40.00 mol % DDS, or any amount between 20.00 mol % and 49.99 mol % in increments of 0.01 mol % such as 28.72 mol %, 47.98 mol %, and the like as well as ranges in increments of 0.01 mol % such as 20.01 mol % to 20.05 mol %, 31.58 mol % to 49.98 mol %, and the like.

Optionally, one or more additional cationic monomers are incorporated into the polymer compositions. Additional cationic monomers comprise, consist essentially of, or consist of one or more copolymerizable monomers bearing a cationic functionality that is not susceptible to cleavage from the polymer composition by hydrolysis. Nonlimiting examples of useful additional cationic monomers include N-alkyl ammonium salts of 2-methyl-1-vinyl imidazole, N-alkyl ammonium salts of 2-vinyl pyridine or 4-vinyl pyridine, and N-vinyl pyridine. The amount of additional cationic monomer incorporated into the polymer compositions is not particularly limited, except that the total number of moles of [DDS+additional cationic monomer] is less than 50 mol % of the polymer composition as discussed above.

Anionic monomers usefully incorporated into the polymer compositions comprise, consist essentially of, or consist of one or more copolymerizable monomers bearing an anionic functionality. In embodiments, suitable anionic functionalities include carboxylate, sulfonate, and phosphonate or mixtures of two or more thereof. In some embodiments, the anionic monomers comprise, consist essentially of, or consist of monomers having an anionic functionality that is hydrolytically stable, that is, the anionic functionality pendant to the unsaturated group, or pendant to the polymer backbone, is not susceptible to substantial hydrolytic cleavage at 100° C. In other embodiments, the anionic monomers comprise, consist essentially of, or consist of monomers having anionic functionality that is susceptible to hydrolytic cleavage from the polymer backbone, wherein such cleavage also results in an anionic functionality bonded to the polymer backbone. In still other embodiments, anionic monomers include mixtures of two more of any such monomers.

Examples of hydrolytically stable anionic monomers include acrylic acid, methacrylic acid, 2-acrylamido-2-methylpropane sulfonic acid (AMS), vinylphosphonic acid, and vinyl sulfonic acid and conjugate bases or neutralized forms thereof (salts). Useful salts of anionic monomers include but are not limited to sodium, lithium, potassium, calcium, magnesium, and ammonium salts. In some embodiments, the anionic monomers comprise, consist essentially of, or consist of acrylic acid, AMS, salts thereof, and/or mixtures of these. Examples of anionic monomers susceptible to hydrolytic cleavage, wherein such cleavage also results in anionic functionality include acrylate and methacrylate esters of anionic compounds and N-acrylamido derivatives of anionic compounds, all of which are capable of hydrolyzing to form carboxylate functionality. For example, 3-sulfopropyl methacrylate forms methacrylic acid and 3-sulfopropanol upon hydrolysis. The anionic monomers are copolymerized with DADMAC and optionally one or more additional cationic monomers. The anionic monomers are polymerized in either protonated (acid) or neutralized (salt) form, depending on the method of copolymerization selected and the convenience of the user.

The amount of anionic monomer usefully incorporated in the polymer compositions is limited to be at least an amount suitable to provide a polymer having a net negative charge. Stated differently, the amount of anionic monomer is selected to provide a ratio of total negative charge to total positive charge in the polymer composition of greater than 1. Total positive charge is determined by the molar charge equivalent imparted by the at least about 20 mol % DDS as discussed above, plus any additional cationic monomers included in the polymer compositions. Total negative charge is determined by the molar charge equivalent imparted by the selected one or more anionic monomers as discussed above. The molar proportion of anionic monomer:cationic monomer in the polymer composition is greater than 1:1. Thus, in some embodiments, the molar proportion of anionic monomer to cationic monomer in the polymer composition is about 1.01:1 to 4.00:1, the range of which includes any proportion within this range in increments of 0.01:1, such as 1.50:1, 3.05:1, 2.78:1, and the like. Thus, in embodiments, the polymer compositions comprise about 20.01 mol % to 80.00 mol % total anionic monomer content, or about 25.00 mol % to 70.00 mol %, or about 27.00 mol % to 60.00 mol %, or about 30.00 mol % to 50.00 mol %, or about 30.00 mol % to 40.00 mol % total anionic monomer content, or any amount between 20.01 mol % and 80.00 mol % in increments of 0.01 mol % such as 28.72 mol %, 47.98 mol %, and the like as well as ranges in increments of 0.01 mol % such as 20.01 mol % to 20.02 mol %, 35.58 mol % to 40.24 mol %, and the like.

Optionally, one or more nonionic monomers are incorporated into the polymer compositions. Nonionic monomers comprise, consist essentially of, or consist of one or more copolymerizable monomers that bear neither a negative charge nor a positive charge. In some embodiments, the nonionic monomer is water soluble, wherein the nonionic monomer solubility in water is at least 10% by weight at 25° C. In some embodiments, the nonionic monomer is hydrolytically stable wherein one or more nonionic functionalities pendant to the unsaturated group, or pendant to the polymer backbone, are not susceptible to substantial hydrolytic cleavage at 100° C. Hydrolytically stable nonionic monomers include N-vinyl pyrrolidone, N,N-diallylamine, and derivatives thereof. In some embodiments, the nonionic monomer is susceptible to hydrolysis, wherein hydrolytic cleavage results in either a nonionic or anionic functionality. Examples of such monomers include acrylamide, methacrylamide, N-alkyl acrylamides and other N-functional acrylamides such as N-(2-hydroxyethyl)acrylamide, esters of acrylic acid and methacrylic acid, and the like. In some embodiments, the nonionic monomers comprise, consist essentially of, or consist of acrylamide, N-vinyl pyrrolidone, and/or a mixture of these. The amount of nonionic monomer incorporated into the polymer compositions is less than 60 mol % and in some embodiments is 0 mol %. Thus, for example in some embodiments the nonionic monomers in the polymer compositions is about 0.00 mol % to 59.99 mol %, or about 10.00 mol % to 50.00 mol %, or about 20.00 mol % to 40.00 mol %, or about 30.00 mol % to 40.00 mol %, or any amount between 0.00 mol % and 59.99 mol % in increments of 0.01 mol % such as 18.72 mol %, 41.25 mol %, and the like as well as ranges in increments of 0.01 mol % such as 0.05 mol % to 0.50 mol %, 31.99 mol % to 33.42 mol %, and the like.

In some embodiments, incorporation of hydrolytically stable nonionic monomers impart an added advantage to the polymer compositions of lowering the total carboxylate content thereof when the polymer composition is employed in a polymer dispersion at temperatures in excess of 100° C. "Total carboxylate content" is the mole percent of anionic monomers in the polymer composition having carboxylate functionality, plus the mole percent of hydrolytically unstable nonionic monomers wherein the hydrolysis thereof causes carboxylate groups to form; that is, the mole percent of carboxylate functionality that may form as a result of hydrolytic conditions encountered by the polymer compositions during use. Thus for example, monomers such as acrylamide will hydrolyze at temperatures in excess of 100° C. over a period of hours or days to form acrylic acid. The newly formed acrylic acid adds to the mole percent carboxylate of the polymer composition. A polymer composition comprising 10 mol % sodium acrylate and 20 mol % acrylamide therefore has a carboxylate content of 30 mol %. For challenging applications in HT/HP reservoirs and other high-temperature EOR applications, we have found that providing a total carboxylate content of about 80 mol % or less is beneficial to the viscosity stability of the polymer compositions. Thus, in embodiments, the total carboxylate content is about 20 mol % to 80 mol %, or about 20 mol % to 70 mol %, or about 20 mol % to 60 mol %, or about 20 mol % to 50 mol %, or about 20 mol % to 40 mol %, or about 25 mol % to 35 mol %.

Without being limited with regard to theory, we believe that providing a total carboxylate content of about 80 mol % or less improves the viscosity stability of the polymer dispersions in water media containing multivalent cations such as calcium, magnesium, aluminum, and the like. In EOR and other mining and waterbased applications, these and a plethora of other multivalent ions may be present. In some embodiments, multivalent cations are capable of forming ionic associations with more than one carboxylate anion in a water dispersion; such associations can act as crosslinks, causing loss of viscosity and even precipitation of the polymer. We have found that by including about 80 mol % to 20 mol % total carboxylate content, or about 70 mol % to 20 mol %, or about 60 mol % to 20 mol %, or about 50 mol % to 20 mol %, or about 40 mol % to 20 mol %, or about 80 mol % to 30 mol %, or about 80 mol % to 40 mol %, or about 80 mol % to 50 mol %, or about 80 mol % to 60 mol % total carboxylate content in the polymer compositions, the polymer dispersions formed therefrom have improved viscosity stability at temperatures over 100° C., during use in applications where multivalent cations are present.

Optionally, the polymer compositions include one or more additional monomers. In some embodiments the polymer compositions include about 0 mol % to 60.00 mol % of one or more additional monomers. Additional monomers include those having specific functionalities intended for a specific purpose. One such additional monomer includes a long-chain hydrocarbyl functionality intended to produce physical or associative crosslinking in a waterbased polymer dispersion. Such hydrophobically associating moieties are well known in the industry. In some embodiments, the hydrocarbyl functionality includes 8 to 20 carbons, or 10 to 20 carbons, or 12 to 20 carbons arranged in a linear, branched, or cyclic conformation. In some embodiments, the hydrophobically associating monomer is hydrolytically stable. Examples of hydrolytically stable hydrophobically associating monomers include N-dodecyl-N-methyl-N,N-diallyl ammonium chloride and N-dodecyl-2-vinyl pyridinium chloride. Both of these monomers are also cationic monomers and thus contribute to the overall net charge of the polymer. In some embodiments, the hydrophobically associating monomers are present in the polymer compositions at about 1 wt % or less of the total weight of the polymer composition, for example about 0.10 wt % to 1.00 wt %, or about 0.3 wt % to 1.00 wt %, or about 0.5 wt % to 1.00 wt % of the total weight of the polymer composition.

Another type of optional additional monomer includes betaine functionality. Carboxymethacrylate betaine monomers are well-known in the art and include those disclosed in U.S. Pat. Nos. 2,777,872; 2,834,758; and 2,846,417. Carboxyvinylpyridine betaine monomers, sulfovinylpyridine betaine monomers, and vinyliandazolium sulfobetaine monomers are also known. In some embodiments, the betaine monomer is hydrolytically stable. The polymer compositions are not particularly limited as to the amount of betaine monomer incorporated therein and can include up to about 60.00 mol % of a betaine monomer.

Optionally, the polymer compositions include one or more crosslinks. In various embodiments the crosslinks are covalent or physical crosslinks. Covalent crosslinking moieties include hydrolytically stable crosslinks and hydrolytically facile crosslinks. Hydrolytically stable crosslinks are formed, for example, by including a monomer having two or more unsaturated moieties wherein the crosslink is not susceptible to hydrolytic cleavage at 100° C. Hydrolytically stable crosslinking monomers include, for example, divinyl benzene, trivinyl benzene, and derivatives thereof. Hydrolytically facile crosslinks are formed by including a monomer having two or more unsaturated moieties wherein the bonds forming the crosslink are susceptible to hydrolysis at 100° C. Hydrolytically facile crosslinking monomers include, for example, ester, carbonate, oxalate, acetal, hemiacetal, or hemiaminal functionality. Commonly employed ester-based crosslinking monomers include, for example, ethylene glycol diacrylate, hexane diol diacrylate, and pentaerythritol tetraacrylate.

Physical crosslinks are polymer-polymer noncovalent bonds that are susceptible to thermal or shear disruption. An example of a physical crosslink is the association between hydrophobic moieties in a water soluble polymer, when present in a waterbased dispersion. Facile crosslinks provide a means to increase viscosity of a polymer dispersion in a way that is easily reversed, by heating or shearing the polymer dispersion. Facile crosslinking is particularly useful in many EOR processes, including those carried out in HT/HP reservoirs. The amount of crosslinking monomers incorporated in a polymer composition depend on the type of crosslink and the molecular weight of the polymer: lower molecular weight polymers benefit from non-facile covalent crosslinking since they increase the polymer dispersion viscosity by effectively increasing molecular weight. However, too high a degree of crosslinking will interfere with flow and sweep efficiency of EOR.

As mentioned above, the polymer compositions have a net negative charge due to the molar adjustment of the ratio of cationic to anionic monomers during polymer synthesis. Synthesis of a polymer composition having a net negative charge ensures that in a polymer dispersion, any subsequent hydrolysis of functionalities from the polymer backbone that result in formation of carboxylate functionality does not cause the polymer to pass through a neutral state, that is, a zero-charge state. Without being limited by theory, we believe that preventing the formation of a zero-charge condition prevents destabilization of the polymer dispersion. We have observed that providing a polymer composition with a net negative charge provides a polymer dispersion having improved viscosity stability at temperatures over 100° C. Combining this strategy with use of at least 20 mol % DDS, that is, a cationic monomer that is not susceptible to hydrolysis, provides a polymer dispersion having stable viscosity when subjected to high temperature EOR conditions. We believe that the charge balance stability of the polymer compositions provides these surprising results.

In some embodiments, the polymer composition comprises, consists essentially of, or consists of a terpolymer having about 20.00 mol % to 49.99 mol % DDS, about 20.01 mol % to 80.00 mol % of an anionic monomer, and about 0 mol % to 59.99 mol % nonionic monomer, wherein the polymer composition comprises a net negative charge. In some embodiments, the polymer composition comprises, consists essentially of, or consists of a terpolymer having about 20.00 mol % to 49.99 mol % DDS, about 25.01 mol % to 60.00 mol % of an anionic monomer, and about 10.00 mol % to 59.99 mol % nonionic monomer, wherein the polymer composition comprises a net negative charge. In some embodiments, the polymer composition comprises, consists essentially of, or consists of a terpolymer having about 25.00 mol % to 40.00 mol % DDS, about 25.01 mol % to 50.00 mol % of an anionic monomer, and about 20.00 mol % to 49.99 mol % of a nonionic monomer, wherein the polymer composition comprises a net negative charge. In some embodiments, the polymer composition comprises, consists essentially of, or consists of a terpolymer having about 25.00 mol % to 30.00 mol % DDS, about 25.01 mol % to 40.00 mol % of an anionic monomer, and about 25.00 mol % to 40.00 mol % of a nonionic monomer, wherein the polymer composition comprises a net negative charge. In some embodiments, the polymer composition comprises, consists essentially of, or consists of a terpolymer having about 20.00 mol % to 30.00 mol % DDS, about 20.01 mol % to 40.00 mol % of an anionic monomer, and about 30.00 mol % to 40.00 mol % of a nonionic monomer, wherein the polymer composition comprises a net negative charge. In some embodiments, the polymer composition comprises, consists essentially of, or consists of a terpolymer having about 25.00 mol % to 30.00 mol % DDS, about 30.00 mol % to 40.00 mol % of an anionic monomer, and about 35.00 mol % to 40.00 mol % of a nonionic monomer, wherein the polymer composition comprises a net negative charge. In some embodiments, DDS is DADMAC. In some embodiments, the anionic monomer comprises, consists essentially of, or consists of one or more monomers selected from acrylic acid, 2-acrylamido-2-methylpropane sulfonic acid, and salts thereof. In some embodiments, the nonionic monomer comprises, consists essentially of, or consists of one or more monomers selected from acrylamide and N-vinyl pyrrolidone.

Synthesis of Polymer Compositions

The polymer compositions are advantageously formed using conventional methods and materials. While not limited thereto, free radical and redox type chain reaction methodologies are advantageously employed in some embodiments due to the known cost efficiency and ability to form very high molecular weight species associated with such techniques.

Thermally induced free radical polymerization is suitably initiated by adding a compound that decomposes homolytically at a known temperature to result in a free radical, which then proceeds to react with the unsaturated site of a monomer and initiate polymerization. Non-limiting examples of thermal free radical initiators include organic peroxides such as dicumyl peroxide, and azo compounds such as 2,2'-azoisobisisobutyronitrile (AIBN) and inorganic peroxides such as potassium persulfate. Redox polymerization is a single electron transfer reaction that has found wide application for initiating polymerization reactions and has industrial importance in low-temperature emulsion polymerizations. Redox reactions are incurred by reduction of e.g. hydrogen peroxide or an alkyl hydrogen peroxide by $Fe^{2+}$, $Cr^{2+}$, $V^{2+}$, $Ti^{3+}$, $Co^{2+}$, or $Cu^{2+}$ salts. Examples of suitable redox systems include t-butylhydroperoxide/ferrous ion and ammonium persulfate/sodium bisulfite.

Photolytically induced free radical polymerization is suitably initiated by a compound that absorbs a known wavelength of light to decompose homolytically; the free radicals formed then initiate polymerization in the same manner as thermal decomposition. In many embodiments, ultraviolet (UV) radiation is employed in the photolysis. AIBN is known to undergo photolysis, as are several other commercially available initiators such as those sold under the trade name IRGACURE® by Ciba Specialty Chemicals Corp. of Tarrytown, N.Y.; those sold under the trade name CHEM-CURE® by Sun Chemical Company of Tokyo, Japan; and LUCIRIN® TPO sold by BASF Corporation of Charlotte, N.C.

Other commonly employed and commercially significant methods of polymerization useful in the synthesis of the polymer compositions include, but are not limited to, irradiation with electron beam (e-beam), irradiation with ionizing radiation, electrolysis, plasma generation, and sonication.

In some embodiments, the polymerization is carried out neat, that is, without a solvent. In other embodiments, the polymerization is carried out in a solvent or an emulsion. In some embodiments, all monomers to be incorporated into the polymer compositions are water soluble, and the polymerization is accomplished using water as a solvent. In some embodiments, the polymerization is accomplished in an oil-in-water or water-in-oil emulsion, depending on the types of monomers employed and the convenience of the user. In some embodiments, surfactants and phase transfer compounds are further employed by one of skill to accomplish the polymerization. It will be appreciated that solvent and emulsion mediated polymerizations, materials useful to accomplish the polymerizations, and conditions used in association with the polymerization such as monomer concentration, choice of initiator type and amount, choice of solvent, temperature, inclusion of additional compounds such as surfactants, and the like are usefully optimized by the skilled artisan to carry out effective polymerization of the selected monomer combinations to result in the polymer compositions of the invention.

In a typical synthesis, monomers are dissolved in water and the pH of the monomer solution is adjusted to a target level. The monomer solution is then purged with an inert gas such as nitrogen in order to remove all traces of oxygen, which would otherwise inhibit the free radical polymerization reaction. Optionally, the monomer solution can be suspended in an emulsion formed by the addition of a water-immiscible solvent such as a hydrocarbon oil, along with emulsifying surfactants such as sorbitan monooleate and/or ethoxylated sorbitan monostearates. Polymerization is then initiated via the addition of a small amount of a free radical initiator. The free radical initiators generally decompose to generate free radicals by one of the mechanisms discussed above. The polymerization reaction is most often conducted between the temperatures of about 10° C. and 110° C.

The polymer compositions are advantageously synthesized using methodology that results in weight-average molecular weights ($M_w$) of at least about 100,000 g/mol. The threshold molecular weight provides sufficient chain length to impart a desirable increase in viscosity when the polymer dispersions are formed. In embodiments, the $M_w$ of the polymer compositions is about 100,000 to 10,000,000 g/mol, or about 500,000 to 8,000,000 g/mol, or about 500,000 to 5,000,000 g/mol, or about 1,000,000 to 5,000,000 g/mol.

In some embodiments, the polymers are substantially linear. In some embodiments, the polymer compositions have a measurable proportion of branching. In some embodiments, the polymer compositions have a substantial amount of branching. In some embodiments, the polymer compositions are hyperbranched. In some embodiments, the polymer compositions are not substantially crosslinked. In other embodiments, the polymer compositions include one or more crosslinks; in some such embodiments the crosslinks are facile and disrupted by hydrolysis, shearing of the polymer dispersion, or both.

In some embodiments, after synthesis the polymer compositions are used substantially as-is, for example in a waterborne dispersion. In some such embodiments the dispersions are further diluted with water or a waterbased composition to a selected concentration. In other embodiments the polymer compositions are isolated after synthesis and dried prior to use, for example for storage purposes. In still other embodiments, the polymer compositions are purified prior to use, for example by precipitation or osmotic purification methods that will be known to those of skill in the art of polymer purification.

Polymer Dispersions

The polymer compositions are advantageously used in one or more polymer dispersions for high temperature applications. In some embodiments, the polymer dispersion is a polymer flooding dispersion, wherein the dispersion is useful in one or more high temperature EOR applications. In some such embodiments, the dispersions are substantially a combination of a polymer composition with water. In some embodiments the dispersions are substantially a combination of a polymer composition with a water source, such as naturally occurring fresh water, produced water, municipal water, well water, treated water, brackish water, or sea water, or a combination of two or more such water sources.

While the polymer dispersions are not particularly limited as to the amount of polymer composition included therein, in some embodiments the polymer dispersions include about 0.01 wt % to 10 wt % of the polymer composition, for example about 0.01 wt % to 5 wt %, or about 0.05 wt % to 4 wt %, or about 0.10 wt % to 2 wt %, or about 0.20 wt % to 1.00 wt % of the polymer composition based on the total weight of the polymer dispersion.

The initial viscosity of a polymer dispersion depends on the particular polymer composition, the amount of the composition present in the dispersion, and the presence of compounds other than water in a dispersion. In embodiments the initial viscosity of a polymer dispersion having substantially only water and about 0.30 wt % of a polymer composition dispersed therein is about 1 cP to 100 cP at 25° C., 39.6 $s^{-1}$ for example 2 cP to initial viscosity of the dispersions In embodiments the initial viscosity of a polymer dispersion comprising naturally occurring fresh water, brackish water, sea water, or a synthetic approximation of one of these and about 0.30 wt % of a polymer composition dispersed therein is about 1 cP to 20 cP, or about 2 cP to 10 cP (25° C., 39.6 $s^{-1}$).

In some embodiments, the polymer dispersions further include one or more additives. Suitable additives for polymer dispersions include, for example, corrosion inhibitors, scale inhibitors, emulsifiers, water clarifiers, dispersants, emulsion breakers, hydrogen sulfide scavengers, gas hydrate inhibitors, biocides, pH modifiers, surfactants, antioxidants, asphaltene inhibitors, paraffin inhibitors, and solvents.

Corrosion Inhibitors

In some embodiments, the polymer dispersion includes a corrosion inhibitor. Suitable corrosion inhibitors include, but are not limited to, amidoamines, quaternary amines, amides, and phosphate esters.

Scale Inhibitors

In some embodiments, the polymer dispersion includes a scale inhibitor. Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamido-methyl propane sulfonate terpolymer (PMA/AMPS).

Emulsifiers

In some embodiments, the polymer dispersion includes an emulsifier. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

Water Clarifiers

In some embodiments, the polymer dispersion includes a water clarifier. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers poly(DADMAC).

Dispersants

In some embodiments, the polymer dispersion includes a dispersant. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

Emulsion Breakers

In some embodiments, the polymer dispersion includes an emulsion breaker. Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

Hydrogen Sulfide Scavengers

In some embodiments, the polymer dispersion includes a hydrogen sulfide scavenger. Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, and monomethylamine triazine), and glyoxal. In certain embodiments, blending the compounds and compositions of the invention with MMA triazines lowers or eliminates offensive MMA odors.

Gas Hydrate Inhibitors

In some embodiments, the polymer dispersion includes a gas hydrate inhibitor. Suitable gas hydrate inhibitors include, but are not limited to, thermodynamic inhibitors (THI), kinetic inhibitors (KHI), and anti-agglomerates (AA). Suitable thermodynamic inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethyl ether, ethylene glycol monobutyl ether), and alkyl or cyclic esters of alcohols (such as ethyl lactate, butyl lactate, methylethyl benzoate). Suitable kinetic inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Biocides

In some embodiments, the polymer dispersion includes a biocide. Any biocide suitable in oilfield operations may be used in embodiments where the polymer dispersion is a polymer flooding dispersion. A biocide may be included in a composition in an amount of about 0.1 ppm to about 1000 ppm, e.g., 0.1 ppm, 0.5 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm or ranges between any two of these.

Suitable biocides include, but are not limited to, oxidizing and non-oxidizing biocides. Suitable non-oxidizing biocides include, for example amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

pH Modifiers

In some embodiments, the polymer dispersion includes a pH modifier. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

Surfactants

In some embodiments, the polymer dispersion includes a surfactant. The surfactant may be a cationic surfactant, an anionic surfactant, an amphoteric surfactant, a zwitterionic surfactant or a nonionic surfactant. In some embodiments where the polymer dispersion is a polymer flooding dispersion, a surfactant may aid in improving the recovery of oil from the formation. A surfactant may be included in an polymer flooding dispersion in an amount of about 100 ppm to about 10000 ppm, e.g., 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, or 10000 ppm or ranges between any two of these.

Suitable surfactants include, but are not limited to, anionic surfactants, cationic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono- and di-alkyl sulfosuccinates and sulfosuccinamates. Suitable anionic surfactants include alkyl or alkyl ether sulfates and sulfonates, such as C14-C24 alpha olefin sulfonates, C13-C18 alcohol ether sulfates, C15-C17 internal olefin sulfonates, and C12-C18 ester sulfonates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters, polyoxyethylene glycol alkyl ethers, polyoxypropyleneglycol alkyl ethers, polyoxyethyleneglycol nonylphenol ethers, poloxamers, cocamide diethanolamine, and polyethoxylated tallow amine. Also included are betaines and sultaines, amphoteric surfactants such as alkyl amphoacetates and amphodiacetates, alkyl amphopropionates and amphodipropionates, and alkyliminodipropionate. In some embodiments, the surfactant is hydrolytically stable at 100° C.; that is, surfactant functionality is retained in hydrolytic conditions at 100° C.

Solvents

In some embodiments, the polymer dispersion includes a solvent. Suitable solvents include, but are not limited to, water, isopropanol, methanol, ethanol, 2-ethylhexanol, heavy aromatic naphtha, toluene, ethylene glycol, ethylene glycol monobutyl ether (EGMBE), diethylene glycol monoethyl ether, and xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like. Representative of non-polar solvents suitable for formulation with the composition include aliphatics such as pentane, hexane, cyclohexane, methylcyclohexane, heptane, decane, dodecane, diesel, and the like; aromatics such as toluene, xylene, heavy aromatic naphtha, fatty acid derivatives (acids, esters, amides), and the like. In some embodiments, the solvent is monoethyleneglycol, methanol, dimethyl sulfoxide (DMSO), dimethylformamide (DMF), tetrahydrofuran (THF), or a combination thereof. In some embodiments, a polymer flooding dispersion comprises from 0 to about 50 wt % of one or more solvents, based on the weight of the dispersion. In some embodiments, the solvent has a boiling point above 100° C. and a suitable vapor pressure between about 100° C. and 190° C. for use as a polymer flooding dispersion in one or more high temperature reservoirs. In some embodiments, the solvent is not flammable. In some embodiments, the solvent is not combustible.

Synergistic Compounds

In some embodiments, the polymer dispersion includes a synergistic compound. Where the polymer dispersion is a polymer flooding dispersion, suitable synergistic compounds include compounds that enhance the hydrogen sulfide scavenging performance of the dispersion. In some embodiments, the synergistic compound is a quaternary ammonium compound, an amine oxide, an ionic or nonionic surfactant, or any combination thereof. Suitable quaternary amine compounds include, but are not limited to, alkyl benzyl ammonium chloride, benzyl cocoalkyl(C12-C18)dimethylammonium chloride, dicocoalkyl (C12-C18) dimethylammonium chloride, di(hydrogenated tallow alkyl) dimethyl quaternary ammonium methyl chloride, methyl bis(2-hydroxyethyl cocoalkyl(C12-C18) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhyexyl) dimethyl quaternary ammonium methyl sulfate. Suitable amine oxide compounds include, but are not limited to, fatty amine oxides such as stearyl dimethylamine oxide, lauryldimethylamine oxide, and cocamidopropylamine oxide, or etheramine oxides such as bis-(2-hydroxyethyl)isodecyloxypropylamine oxide.

In some embodiments, the synergist compound(s) is present in the polymer dispersion from about 0.01 to about 20 wt % of the dispersion. In some embodiments, the synergistic compound is present at about 0.1 to 10 wt %, about 1 to 9 wt %, about 2 to 8 wt %, about 3 to 7 wt %, or about 4 to 6 wt % in the polymer dispersion. In some embodiments, the synergist compound(s) are added to a fluid or gas simultaneously with the polymer flooding dispersion; in other embodiments, the synergist compound(s) are added separately.

Asphaltene Inhibitors

In some embodiments, the polymer dispersion includes an asphaltene inhibitor. Where the polymer dispersion is a polymer flooding dispersion, suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

Paraffin Inhibitors

In some embodiments, the polymer dispersion includes a paraffin inhibitor. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

Antioxidants

In some embodiments, the polymer dispersion includes an antioxidant. Where the polymer dispersion is a polymer flooding dispersion, any antioxidant suitable in oilfield operations may be used. Exemplary antioxidants include but are not limited to sulfites, thiocyanates and thiosulfates. An antioxidant may be included in a composition in an amount of about 1 ppm to about 1000 ppm, e.g., 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

Additional Components

In some embodiments, the polymer dispersions further include one or more additional functional agents or additives that provide a beneficial property. Additional agents or additives will vary according to the polymer flooding dispersion being manufactured and its intend use as one skilled in the art will appreciate.

In embodiments, the viscosity of a polymer dispersion is stable for up to 700 days at a temperature between about 100° C. and 190° C. For example, in embodiments, the viscosity of a polymer dispersion is stable for up to 700 days at a temperature of about 110° C. to 190° C., about 120° C. to 180° C., about 120° C. to 170° C., about 120° C. to 160° C., or about 120° C. to 150° C. In embodiments, the viscosity of a polymer dispersion is stable for a period of about 2 days to 700 days at 120° C., or about 2 days to 600 days at 120° C., or about 2 days to 500 days at 120° C., or about 2 days to 400 days at 120° C., or about 2 days to 300 days at 120° C., or about 2 days to 700 days at 120° C. in increments of 1 day, for example 3 days, 4, days, 5 days, and the like and further including all ranges thereof in 1 day increments, such as about 565 days to 624 days, or about 3 days to 15 days, or about 8 days to 391 days at 120° C.

In such embodiments, the viscosity of the polymer dispersion measured after the indicated period of time at the indicated temperature is at least about 50% of the initial viscosity of the polymer dispersion, for example 48% to about 100%, or about 50% to 90%, or about 50% to 80%, or about 50% to 70%, or about 50% to 60% of the initial viscosity of the polymer dispersion. In some embodiments, the viscosity of the polymer dispersion measured after the indicated period of time is about 100% of the initial viscosity of the polymer dispersion, or is greater than 100% of the initial viscosity of the polymer dispersion, for example about 100% to 500%, or about 100% to 400%, or about 100% to 300%, or about 100% to 200% of the initial viscosity of the polymer dispersion.

In some embodiments, the viscosity of the polymer dispersion measured after an initial period of about 1 day, 2 days, or 3 days storage of the dispersion at 120° C. is at least about 50% of the initial viscosity of the polymer dispersion, for example 48% to about 100%, or about 50% to 90%, or about 50% to 80%, or about 50% to 70%, or about 50% to 60% of the initial viscosity of the polymer dispersion. In some such embodiments, the viscosity of the polymer dispersion after storage at 120° C. is substantially unchanged after the initial period, wherein "substantially unchanged" means in this context that the viscosity is further reduced about 10% or less, for example about 10% to 0%, or about 8% to 1%, or about 6% to 2%, or about 4% to 2%, or about 9% to 0%, or about 8% to 0%, or about 7% to 0%, or about 6% to 0%, or about 5% to 0%, or about 4% to 0%, or about 3% to 0%, or about 2% to 0%, or about 1% to 0%, or less than 1% based on the initial viscosity of the dispersion (prior to storage at 120° C.).

Methods of Enhanced Oil Recovery

We have found a method of enhanced recovery of a hydrocarbon fluid from a subterranean formation wherein subterranean temperatures are greater than 100° C. The method comprises introducing into the formation a polymer dispersion that has a stable viscosity when exposed to temperatures of 100° C. and greater, for example about 100° C. to 190° C., for a period of at least 2 days. Thus, the initial viscosity of the polymer dispersions is reduced by 50% or less after 2 or more days at 100° C. to 190° C., for example at 120° C. to 170° C. Such polymer dispersions have suitable viscosity to achieve mobility control in enhanced oil recovery (EOR) applications at high reservoir temperatures, resulting in displacement the hydrocarbon fluid into one or more production and/or transportation vessels.

In some embodiments, the method includes (a) forming a polymer composition including about 20.00 mol % to 49.99 mol % of an N,N-dialkyl-N,N-diallylammonium salt, wherein the polymer composition comprises a net negative charge; (b) adding water to the polymer composition to form a polymer dispersion, the dispersion including about 0.01 wt % to 5 wt % of the polymer composition; and (c) employing the polymer dispersion in an enhanced oil recovery operation in a subterranean reservoir, the reservoir characterized by temperatures of about 100° C. to 190° C.

In order to efficiently displace the hydrocarbon fluid from a subterranean formation using the method discussed above, the polymer dispersion should have a viscosity that is close to the viscosity of the hydrocarbon fluid. By adding a polymer composition to a water source, the viscosity of the water source is increased to a value approaching that of the hydrocarbon fluid. The mobility of the polymer dispersion is decreased during use, thus displacing the hydrocarbon fluid from the subterranean formation. The polymer compositions therefore are advantageously included in the polymer dispersions in an amount that suitably produces a viscosity at a temperature selected between 100° C. and 190° C. that is close to the viscosity of the hydrocarbon fluid at the selected temperature. The selected temperature is the temperature of the reservoir environment targeted for the enhanced recovery. Routine experimentation and optimization will easily provide one of skill with the optimal amount of polymer composition to include in the polymer dispersions for the targeted application. Such amounts take into account additional components present in a polymer flooding dispersion such as any of the additional components described above and their effects on the initial viscosity of the polymer dispersion.

EXPERIMENTAL

Example 1

Three polymers were synthesized using thermally initiated free radical polymerization of the indicated monomers at the indicated molar composition ratio in water. Polymer 1 is a 35/37/27 poly(acrylamide/sodium acrylate/DADMAC) terpolymer. Polymer 1 was diluted after synthesis to 3000 ppm (0.3 wt %) using either fresh water or synthetic sea water. After dilution, the bulk viscosity of the dispersion was measured to provide a baseline measurement (0 days aged at 120° C.). After measuring viscosity, the dispersion was deoxygenated, and the deoxygenated dispersion was sealed and stored in an oven set to a temperature of 120° C. Aliquots were removed periodically to test the viscosity of the dispersion. Viscosities of all polymer dispersions were measured at a shear rate of 39.6 s$^{-1}$ using either an Anton Paar MCR 302 rheometer (available from Anton Paar GmbH of Graz, Austria), or a Brookfield DV2T Viscometer (available from Brookfield Engineering Laboratories, Inc.). Unless otherwise indicated, all viscosities were measured at 25° C.

Figure 1:
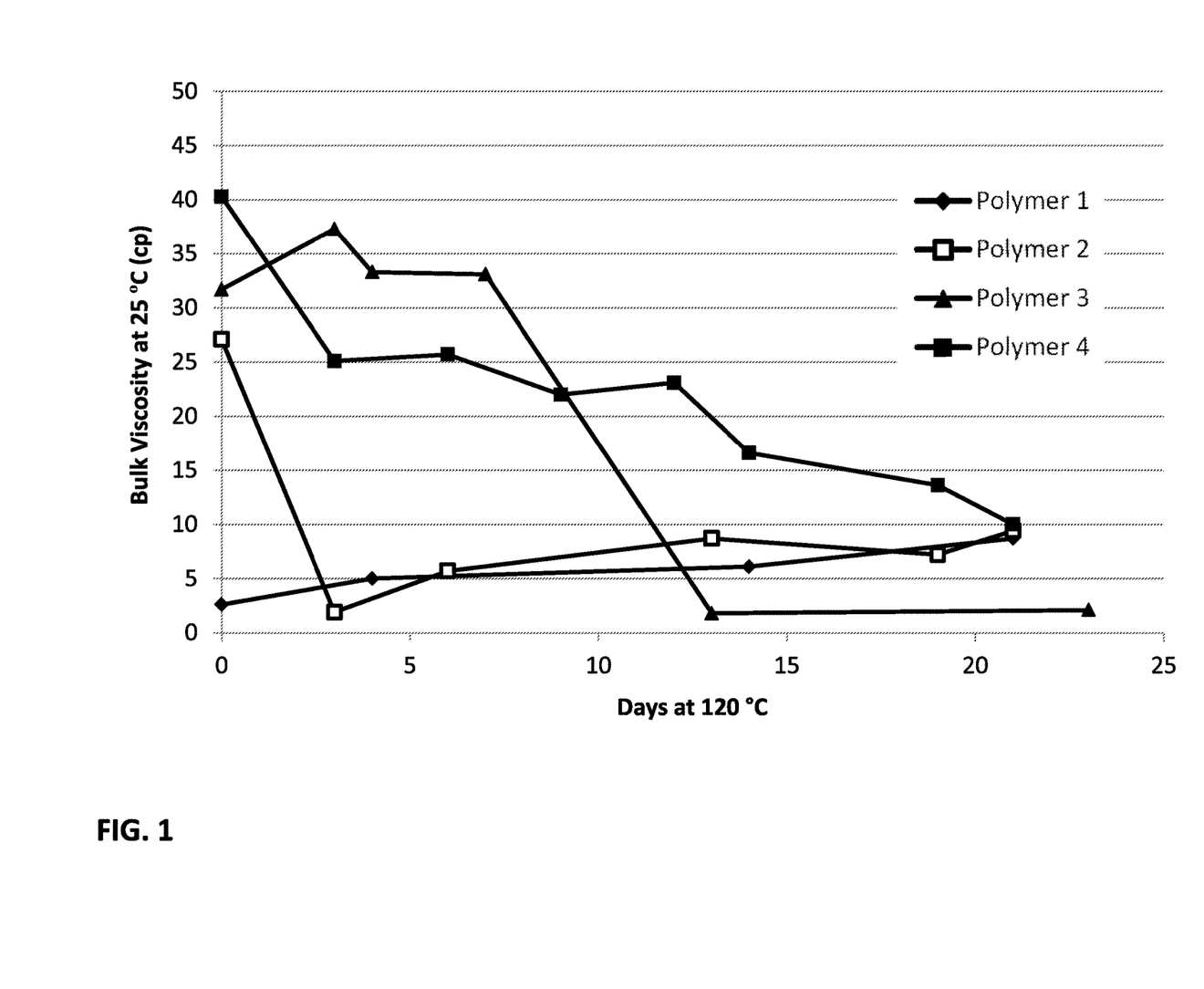
FIG. 1 is a plot of bulk viscosity as a function of number of days aged at 120° C. for freshwater polymer dispersions of the invention in freshwater.

Table 1 shows the viscosity of Polymer 1 in synthetic fresh water and synthetic sea water after the indicated periods of time at 120° C. FIG. 1 shows a plot of Polymer 1 viscosity over time at 120° C. in synthetic fresh water and FIG. 2 shows a plot of Polymer 1 viscosity over time at 120° C. in synthetic sea water.

Figure 2:
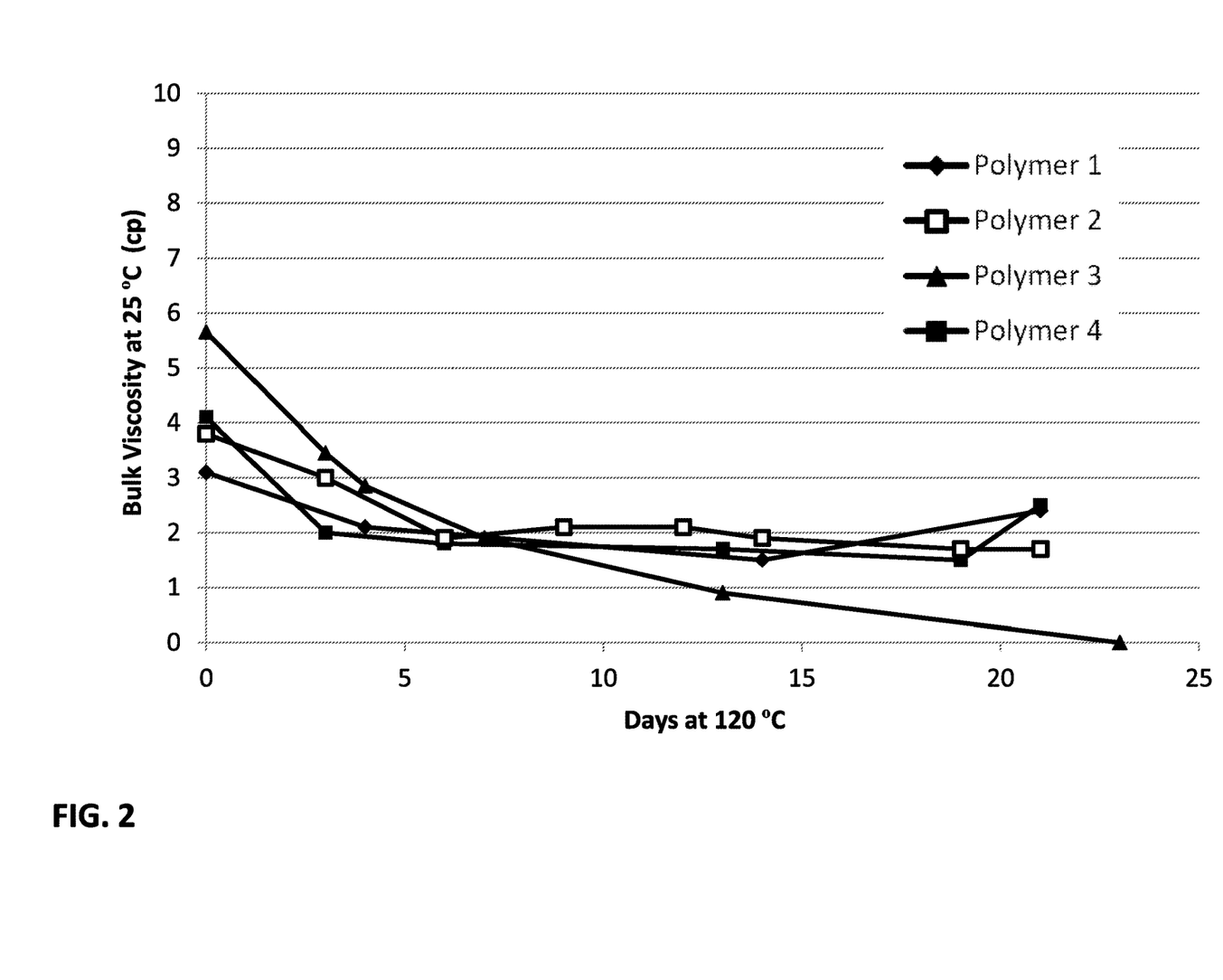
FIG. 2 is a plot of bulk viscosity as a function of number of days aged at 120° C. for polymer dispersions of the invention in seawater.

The viscosity of the Polymer 1 dispersions, shown in FIGS. 1 and 2, shows two desirable properties for use as a mobility control polymer for EOR polymer flooding at temperatures above 100° C.: first, the polymer dispersion has an initial viscosity of about 2 cP in fresh water and about 3 cP in sea water, which is close to the viscosity measured for residual oil in high temperature reservoirs (about 4-8 cP depending on actual temperature); second, the polymer dispersion viscosity is stable after three weeks at 120° C. The final viscosity of Polymer 1 is about 10 cP in fresh water (higher than the initial viscosity) and about 2 cP in sea water.

Polymers 2 and 3, were synthesized in the same manner as Polymer 1. Referring to monomer molar ratios, Polymer 2 is a 73/27 poly(acrylamide/DADMAC) copolymer. Polymer 3 is a 75/25 poly(AMS/acrylamide) copolymer. Polymer 4 is a poly(acrylamide/sodium acrylate/NVP) copolymer dispersed in the indicated liquid at 0.30 wt %. Polymers 2, 3, and 4 were subjected to the same dilution and heat aging as Polymer 1, except that Polymer 3 was diluted to 1500 ppm (0.15 wt %). Table 1, FIG. 1, and FIG. 2 show viscosities of these polymer dispersions after the indicated periods of storage at 120° C.

TABLE 1

Polymer dispersion viscosity after aging at 120° C.

| Monomer ratio | Sample | Days Aged at 120° C. | Viscosity in Fresh Water (cP) | Viscosity in Sea Water (cP) |
|---|---|---|---|---|
| p(Am/AA/DADMAC) 37/35/27 | Polymer 1 (3000 ppm) | 0 | 2.6 | 3.1 |
| | | 4 | 5 | 2.1 |
| | | 14 | 6.1 | 1.5 |
| | | 21 | 8.7 | 2.4 |
| p(Am/DADMAC) 73/27 | Polymer 2 (3000 ppm) | 0 | 27.1 | 4.1 |
| | | 3 | 1.9 (precipitate) | 2 |
| | | 6 | 5.7 | 1.8 |
| | | 13 | 8.7 | 1.7 |
| | | 19 | 7.2 | 1.5 |
| | | 21 | 9.4 | 2.5 |
| p(Am/ATBS) 75/25 | Polymer 3 (1500 ppm) | 0 | 31.7 | 5.65 |
| | | 3 | 37.3 | 3.45 |
| | | 4 | 33.3 | 2.85 |
| | | 7 | 33.1 | 1.9 |
| | | 13 | 1.8 | 0.9 |
| | | 23 | 2.1 | 0 |
| p(Am/AA/NVP) | Polymer 4 (3000 ppm) | 0 | 40.3 | 3.8 |
| | | 3 | 25.1 | 3 |
| | | 6 | 25.7 | 1.9 |
| | | 9 | 22 | 2.1 |
| | | 12 | 23.1 | 2.1 |
| | | 14 | 16.6 | 1.9 |
| | | 19 | 13.6 | 1.7 |
| | | 21 | 10 | 1.7 |

Example 2

Polymer 5 was synthesized using thermally initiated free radical polymerization of the indicated monomers at the indicated molar composition ratio in water. Polymer 5 is a poly(acrylamide/sodium acrylate/DADMAC) terpolymer having a molar ratio of 34/34/32. Polymer 6 is a poly(acrylamide/NVP/AMS) terpolymer having a molar ratio of 50-65 acrylamide, 15-25 NVP, and 20-25 AMS. Polymers 4, 5, and 6 were each dispersed at 0.75 wt % (7500 ppm) solids in 3.5 wt % synthetic sea water for evaluation.

Figure 3:
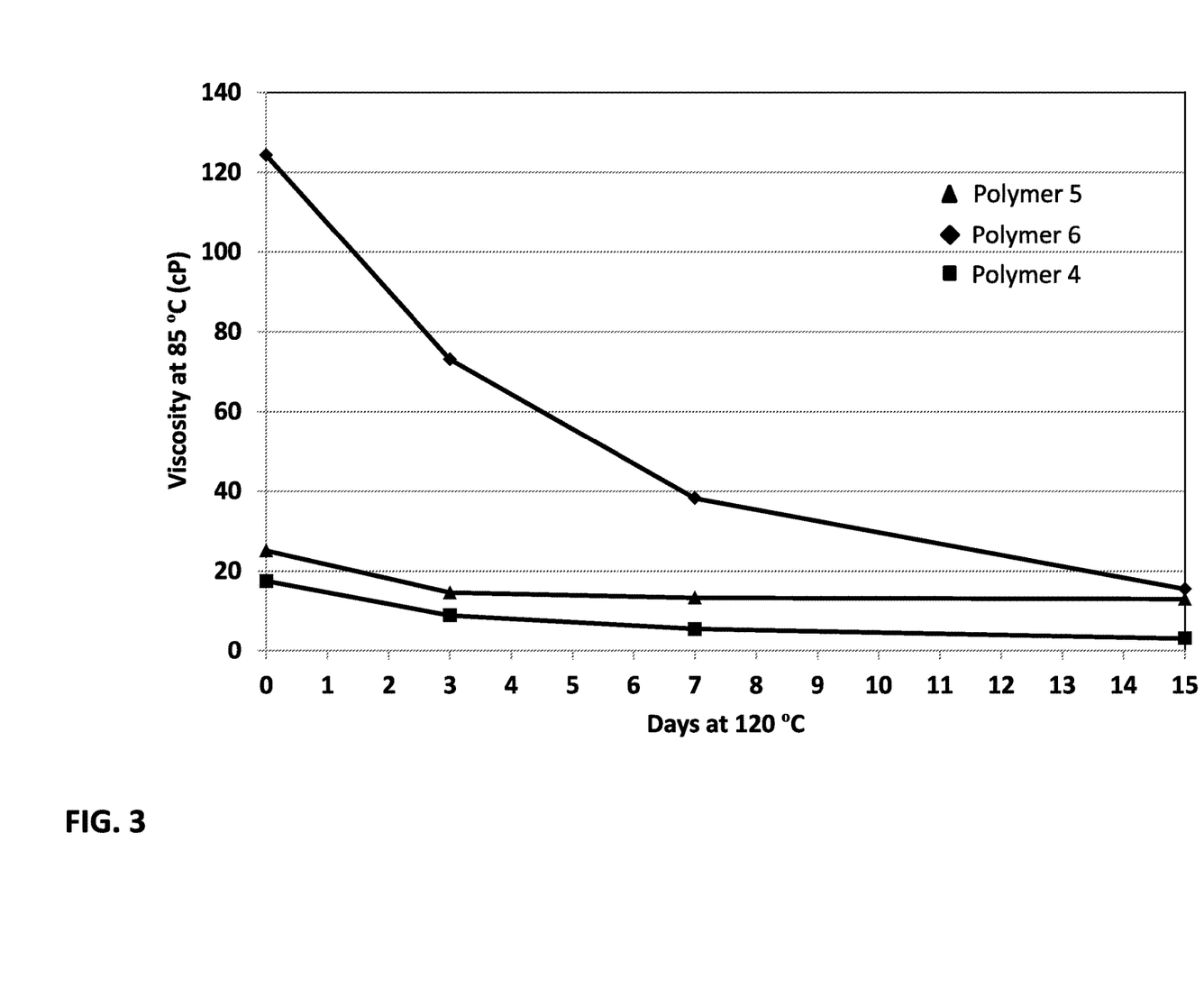
FIG. 3 is a plot of viscosity as a function of temperature for a polymer dispersion of the invention and two comparative polymers before and after 3 days of aging at 120° C.

Viscosities of the three dispersions were measured using an Anton Paar MCR 302 rheometer (available from Anton Paar GmbH of Graz, Austria). The shear rate for all measurements was 7 s$^{-1}$.) The initial viscosity of the three dispersions was measured at 25° C. and 85° C., then the dispersions were deoxygenated and stored in an oven set to a temperature of 120° C. for 15 days. Aliquots were removed periodically for Brookfield viscosity measurements at 25° C.

and 85° C. Viscosity stability of polymers was evaluated by measuring their viscosity after periods of storage at 120° C. The results are shown in Tables 2 (25° C. viscosity measurement) and 3 (85° C. viscosity measurement). FIG. 3 is a plot showing the results tabulated in Table 2.

TABLE 2

Viscosity (cP) of the indicated 0.75 wt % dispersion in 3.5 wt % synthetic sea water at 25° C., after storage at 120° C.

| Days @ 120° C. | Polymer 6 | Polymer 4 | Polymer 5 |
|---|---|---|---|
| 0 | 124.3 | 17.5 | 25.1 |
| 3 | 73.1 | 8.9 | 14.6 |
| 7 | 38.2 | 5.5 | 13.3 |
| 15 | 15.5 | 3.1 | 13.0 |
| % drop in viscosity in 15 days | 87.53 | 82.29 | 48.21 |

TABLE 3

Viscosity (cP) of the indicated 0.75 wt % dispersion in 3.5 wt % synthetic sea water at 85° C., after storage at 120° C.

| Days @ 120° C. | Polymer 6 | Polymer 4 | Polymer 5 |
|---|---|---|---|
| 0 | 50.4 | 7.1 | 9.5 |
| 3 | 44.6 | 4.5 | 5.4 |
| 7 | 23.1 | 2.1 | 4.9 |
| 15 | 7.7 | 1.8 | 4.6 |
| % drop in viscosity in 15 days | 84.72 | 74.65 | 51.58 |

Figure 4:
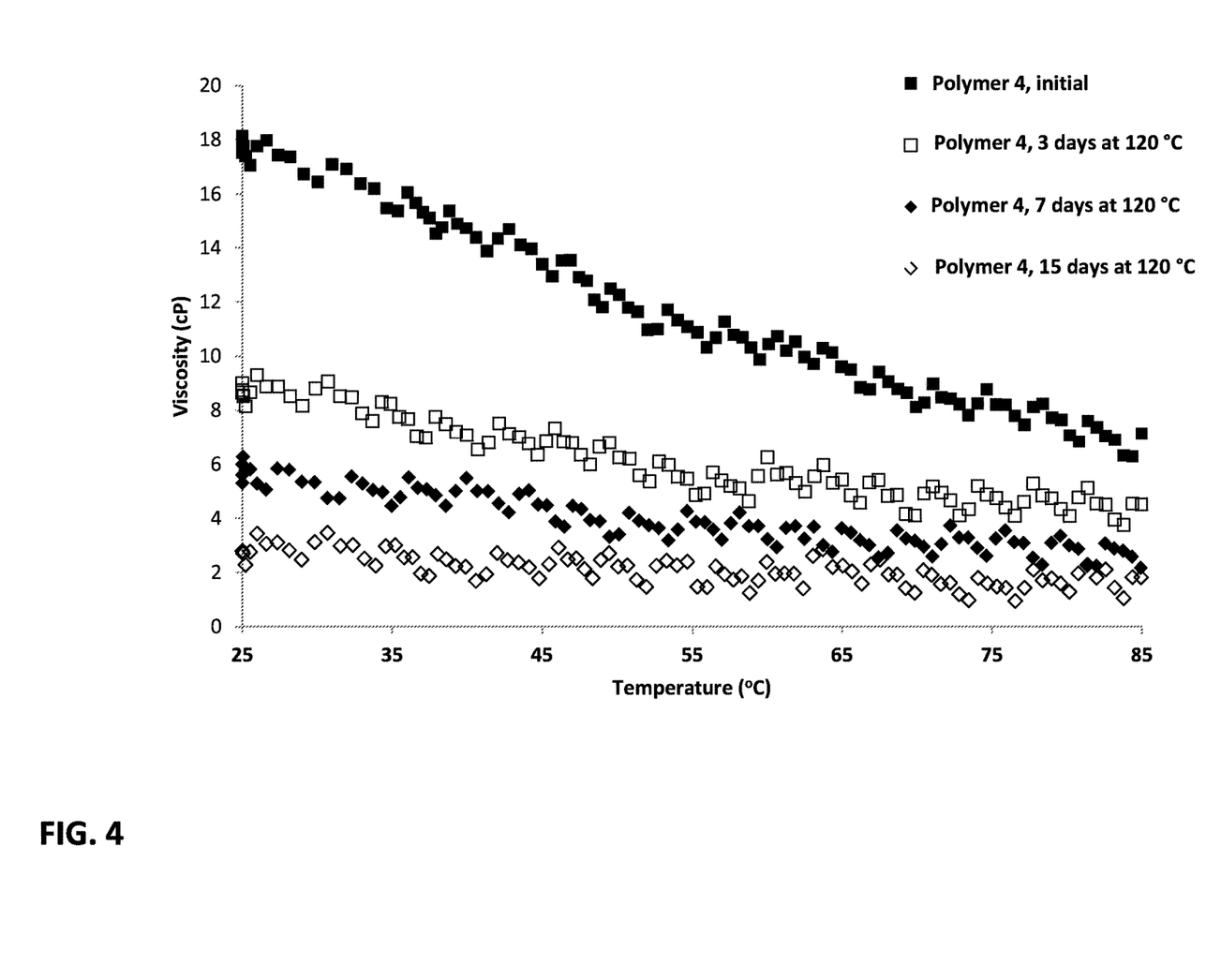
FIG. 4 is a plot of viscosity as a function of temperature for a commercial polymer dispersion before and after aging at 120° C.
Figure 5:
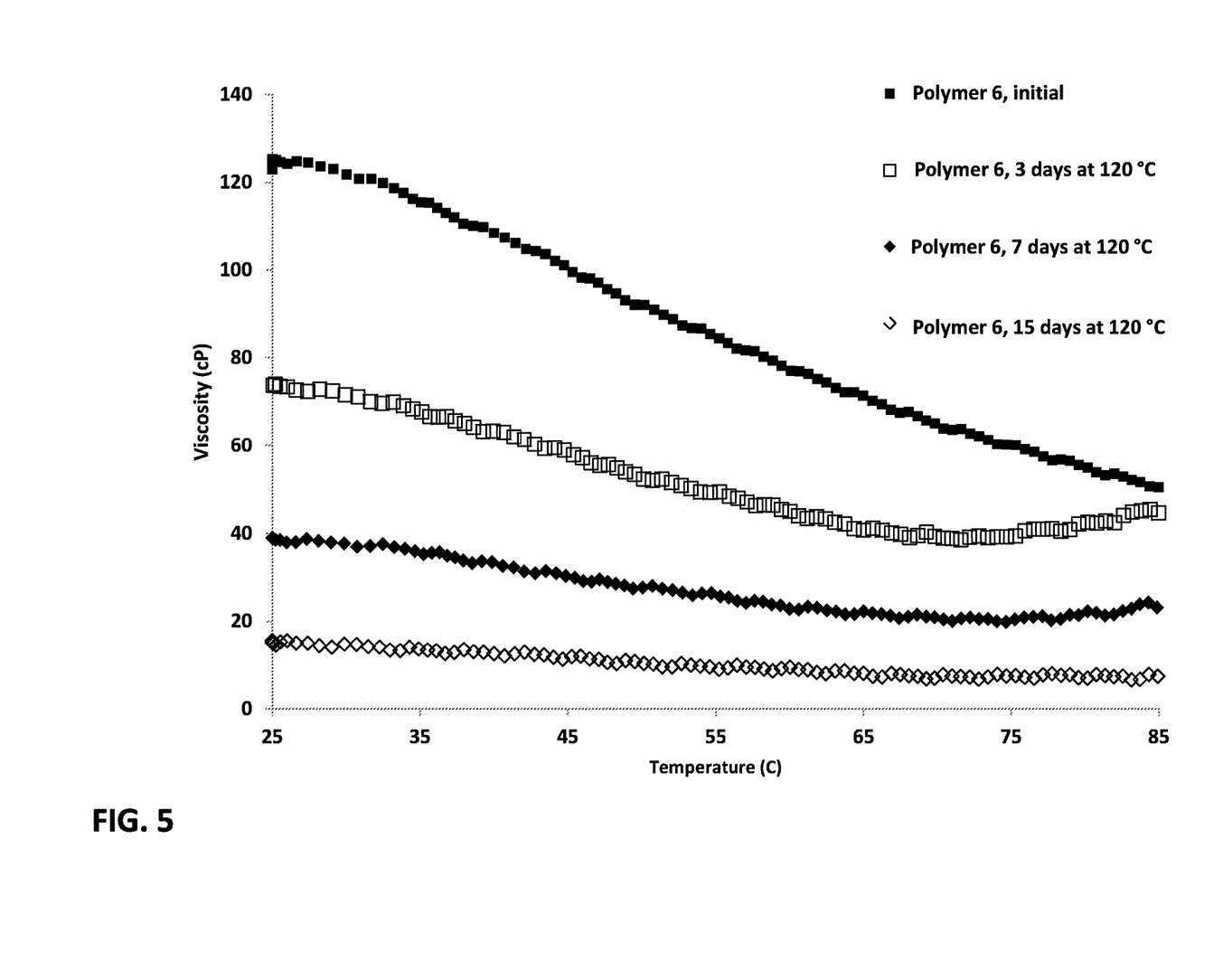
FIG. 5 is a plot of viscosity as a function of temperature for another commercial polymer dispersion before and after aging at 120° C.
Figure 6:
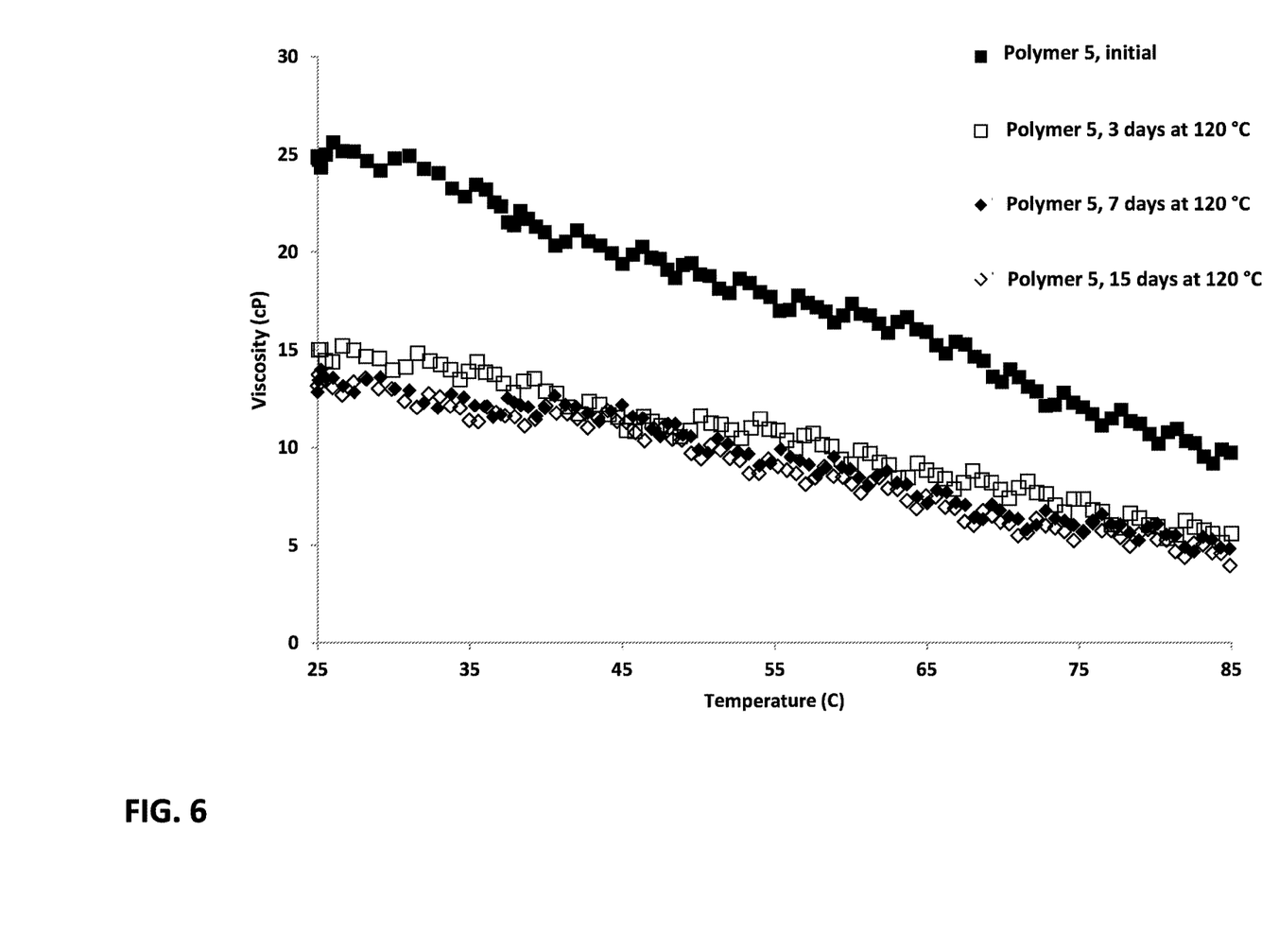
FIG. 6 is a plot of viscosity as a function of temperature for a polymer dispersion of the invention before and after aging at 120° C.

Additionally, viscosity as a function of temperature was evaluated for these three dispersions. FIG. 4 is a plot showing the dispersion behavior of 0.75 wt % Polymer 4 in 3.5 wt % synthetic seawater after 0, 3, 7, and 15 days at 120° C. as a function of measurement temperature. FIG. 5 is a plot showing the dispersion behavior of 0.75 wt % Polymer 6 in 3.5 wt % synthetic seawater after 0, 3, 7, and 15 days at 120° C. as a function of measurement temperature. FIG. 6 is a plot showing the dispersion behavior of 0.75 wt % Polymer 5 in 3.5 wt % synthetic seawater after 0, 3, 7, and 15 days at 120° C. as a function of measurement temperature. All measurements were made using an Anton Paar MCR 302 rheometer (available from Anton Paar GmbH of Graz, Austria), temperature ramp of 8° C./min and shear rate of 7 s$^{-1}$.

In reviewing FIGS. 4-6, it can be seen that the Polymer 4 dispersion undergoes more than 50% reduction in viscosity, measured at 25° C., after 3 days storage at 120° C.; the Polymer 6 dispersion undergoes a 40% reduction. Further, viscosities of both Polymer 4 and Polymer 6 dispersions continue to fall between 3 and 15 days. In sharp contrast, the Polymer 5 dispersion undergoes a 40% or less initial drop in viscosity, measured at any temperature between 25° C. and 85° C., after 3 days storage at 120° C. Further, viscosity of the Polymer 5 dispersion is substantially the same after 3, 7, and 15 days at 120° C. This stability is present over the entire measured temperature range of 25° C. to 85° C.

The invention illustratively disclosed herein can be suitably practiced in the absence of any element which is not specifically disclosed herein. While the invention is susceptible to various modifications and alternative forms, specifics thereof have been shown by way of examples, and are described in detail. It should be understood, however, that the invention is not limited to the particular embodiments described. On the contrary, the intention is to cover modifications, equivalents, and alternatives falling within the spirit and scope of the invention. In various embodiments, the invention suitably comprises, consists essentially of, or consists of the elements described herein and claimed according to the claims.

Additionally each and every embodiment of the invention, as described here, is intended to be used either alone or in combination with any other embodiment described herein as well as modifications, equivalents, and alternatives thereof falling within the spirit and scope of the invention.

The invention claimed is:

1. A method of high temperature enhanced oil recovery, the method consisting essentially of the steps in order:
   a. determining that a subterranean reservoir is in need of enhanced oil recovery;
   b. determining that the subterranean reservoir comprises a bottomhole temperature between 100° C. and 190° C. and hydrolytic conditions;
   c. selecting a polymer composition for injecting into the subterranean reservoir, the polymer composition having a net negative charge and a total carboxylate content of 80.00 mole % to 20.00 mole % and consisting essentially of the polymerized residues of
      i. about 20.00 mol % to 30.00 mol % of an N,N-dialkyl-N,N-diallylammonium salt,
      ii. about 20.01 mol % to 40.00 mol % acrylic acid, 2-acrylamide-2-methylpropane sulfonic acid, a salt thereof, or a mixture thereof, and
      iii. about 30.00 mol % to 40.00 mol % acrylamide, N-vinylpyrrolidone, or an ester of acrylic acid;
   d. adding water to the polymer composition to form a polymer dispersion, the dispersion comprising about 0.01 wt % to 5 wt % of the polymer composition;
   e. injecting the polymer dispersion into the subterranean reservoir;
   f. allowing at least a portion of the polymer dispersion to remain within the subterranean reservoir for a period of 2 days to 700 days; and
   g. displacing a hydrocarbon fluid from the subterranean reservoir, wherein the viscosity of the polymer dispersion after the period is at least 50% of the initial viscosity.

2. The method of claim 1 wherein the reservoir environment includes temperatures of about 120° C. to 170° C.

3. A method of high temperature enhanced oil recovery, the method consisting essentially of:
   a. determining that a subterranean environment is in need of enhanced oil recovery;
   b. determining that the subterranean reservoir environment comprises a temperature of about 120° C. to 170° C. and multivalent cations;
   c. selecting a polymer composition for injecting into the subterranean reservoir, the polymer composition having a net negative charge and a total carboxylate content of 80.00 mole % to 20.00 mole % and consisting essentially of the polymerized residues of about 25.00 mol % to 49.00 mol % of N,N-dimethyl-N,N-diallylammonium chloride, about 30.00 mol % to 40.00 mol % of acrylamide, and about 30.00 mol % to 40.00 mol % of acrylic acid or a salt thereof;
   d. combining about 0.01 wt % to 5 wt % of the polymer composition with water to form a polymer dispersion; and
   e. injecting the polymer dispersion into the subterranean reservoir;

f. allowing at least a portion of the polymer dispersion to remain within the subterranean reservoir for a period of 2 days to 700 days; and
g. displacing a hydrocarbon fluid from the subterranean formation, wherein the viscosity of the polymer dispersion after the period is at least 50% of the initial viscosity.

* * * * *